(12) United States Patent
Adams et al.

(10) Patent No.: US 8,583,624 B2
(45) Date of Patent: Nov. 12, 2013

(54) RESEARCH RAPIDITY AND EFFICIENCY IMPROVEMENT BY ANALYSIS OF RESEARCH ARTIFACT SIMILARITY

(75) Inventors: James C. Adams, Birmingham, AL (US); Richard D. Dettinger, Rochester, MN (US); Daniel P. Kolz, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/265,688

(22) Filed: Nov. 5, 2008

(65) Prior Publication Data

US 2009/0063477 A1 Mar. 5, 2009

Related U.S. Application Data

(63) Continuation of application No. 11/005,435, filed on Dec. 6, 2004, now Pat. No. 7,480,648.

(51) Int. Cl.
G06F 7/00 (2006.01)

(52) U.S. Cl.
USPC ........... 707/713; 707/722; 707/736; 707/758; 707/769

(58) Field of Classification Search
USPC .................. 707/713, 722, 736, 758, 769
See application file for complete search history.

(56) References Cited

U.S. PATENT DOCUMENTS

| | | | |
|---|---|---|---|
| 5,253,362 A | 10/1993 | Nolan et al. | |
| 5,734,887 A | 3/1998 | Kingberg et al. | |
| 5,870,559 A | 2/1999 | Leshem et al. | |
| 5,958,008 A | 9/1999 | Pogrebisky et al. | |
| 6,233,570 B1 | 5/2001 | Horvitz et al. | |
| 6,341,277 B1 | 1/2002 | Coden et al. | |
| 6,408,291 B1 | 6/2002 | Skeen et al. | |
| 6,460,043 B1 | 10/2002 | Tabbara et al. | |
| 6,484,162 B1 | 11/2002 | Edlund et al. | |
| 6,484,164 B1 | 11/2002 | Nikolovska et al. | |
| 6,499,026 B1 | 12/2002 | Rivette et al. | |
| 6,546,388 B1 | 4/2003 | Edlund et al. | |
| 6,553,368 B2 | 4/2003 | Martin et al. | |
| 6,601,065 B1 | 7/2003 | Nelson et al. | |
| 6,618,727 B1 | 9/2003 | Wheeler et al. | |
| 6,633,817 B1 | 10/2003 | Walker et al. | |
| 6,658,410 B1 | 12/2003 | Sakamaki et al. | |
| 6,711,563 B1 | 3/2004 | Koskas | |
| 6,725,227 B1 | 4/2004 | Li | |
| 6,745,178 B1 | 6/2004 | Emens et al. | |
| 6,772,150 B1 | 8/2004 | Whitman et al. | |
| 6,803,927 B1 | 10/2004 | Sahoo et al. | |
| 6,820,076 B2 | 11/2004 | Bailey et al. | |
| 6,928,431 B2 | 8/2005 | Dettinger et al. | |

(Continued)

OTHER PUBLICATIONS

Went et al., WWW10, May 1-5, 2001, Hong Kong, pp. 162-168.*

(Continued)

*Primary Examiner* — Cheyne D Ly
(74) *Attorney, Agent, or Firm* — Patterson & Sheridan LLP

(57) ABSTRACT

Methods for comparing query-related objects are provided. In one embodiment, a first plurality of query-related objects for a first user is compared to a second plurality of query-related objects for a second user to determine a degree of similarity between the first and second plurality of query-related objects. A notification of the degree of similarity is issued.

12 Claims, 12 Drawing Sheets

(56) References Cited

U.S. PATENT DOCUMENTS

| | | |
|---|---|---|
| 6,947,928 B2 | 9/2005 | Dettinger et al. |
| 6,954,748 B2 | 10/2005 | Dettinger et al. |
| 6,996,558 B2 | 2/2006 | Dettinger et al. |
| 7,003,730 B2 | 2/2006 | Dettinger et al. |
| 7,024,425 B2 | 4/2006 | Krishnaprasad et al. |
| 7,092,236 B2 | 8/2006 | Lee et al. |
| 7,096,229 B2 | 8/2006 | Dettinger et al. |
| 7,343,365 B2 | 3/2008 | Farnham et al. |
| 8,078,631 B2 | 12/2011 | Adams et al. |
| 2001/0047270 A1 | 11/2001 | Gusick et al. |
| 2002/0046281 A1 | 4/2002 | Cope |
| 2003/0014399 A1* | 1/2003 | Hansen et al. ............ 707/3 |
| 2003/0046385 A1 | 3/2003 | Vincent |
| 2003/0061215 A1 | 3/2003 | Messina |
| 2003/0126136 A1* | 7/2003 | Omoigui ............ 707/10 |
| 2003/0144994 A1* | 7/2003 | Wen et al. ............ 707/3 |
| 2003/0172056 A1 | 9/2003 | Dettinger et al. |
| 2004/0048233 A1 | 3/2004 | Matthews et al. |
| 2004/0059746 A1 | 3/2004 | Error et al. |
| 2005/0203878 A1* | 9/2005 | Brill et al. ............ 707/3 |
| 2005/0289100 A1 | 12/2005 | Dettinger et al. |
| 2006/0053142 A1* | 3/2006 | Sebbane ............ 707/102 |
| 2006/0122965 A1 | 6/2006 | Adams et al. |

OTHER PUBLICATIONS

Llama, "Search Your Database", Jan. 18, 2002, Codewalkers, pp. 1-4.
Meng, Weiyi, et al, "A Theory of Translation From Relational Queries to Hierarchical Queries", Apr. 1995, IEEE, pp. 228-245.
Wen et al, Information Retrieval and Clustering, W. Wu and H. Xiong (EDS), pp. 1-30, 2002.
Wen et al, ACM Transactions of Information Systems, vol. 20, No. 1, Jan. 2002, pp. 59-81.
Raghavan et al, SIGIR'95, Seattle, WA, 1995, pp. 344-350.
Braunmuller et al, IEEE Transactions on Knowledge and Data Engineering, vol. 13, No. 1, 2001, pp. 79-95.

* cited by examiner

QUERY COMPARISON RESULTS FOR JOE SMITH:

| | RESULT RANK (1002) | RESEARCHER/ LOCATION (1004) | SIMILARITY SCORE (1006) | COMPARISON RESULTS ANALYSIS (1008) |
|---|---|---|---|---|
| 1010 | 1 | Sarah WADE/ UCLA | 7 | 3 MATCHED QUERY CONDITIONS<br>2 MATCHED QUERY RESULTS (1 NEW)<br>1 MATCHED ANALYSIS ROUTINE |
| 1012 | 2 | Scott JOHNSON/ MIT | 4 | 2 MATCHED QUERY CONDITIONS<br>2 MATCHED QUERY RESULTS |
| 1014 | 3 | Bob ANDERSON/ CORNELL | 2 | 2 MATCHED QUERY CONDITIONS |

FIG. 10

RESEARCH RAPIDITY AND EFFICIENCY IMPROVEMENT BY ANALYSIS OF RESEARCH ARTIFACT SIMILARITY

CROSS-REFERENCE TO RELATED APPLICATIONS

This application is a continuation of co-pending U.S. patent application Ser. No. 11/005,435, filed Dec. 6, 2004, now U.S. Pat. No. 7,480,648 which is herein incorporated by reference in its entirety.

BACKGROUND OF THE INVENTION

1. Field of the Invention

The present invention generally relates to a method of examining queries in a database management system and notifying users based on the results of the examination.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application, operating system or end-user) demands access to a specified database by issuing a database access request. Such requests may include, for instance, simple catalog lookup requests or transactions and combinations of transactions that read, change and add specified records in the database. These requests are made using high-level query languages such as Structured Query Language (SQL). Illustratively, SQL is used to construct a query that retrieves information from and updates information in a database. Known databases include International Business Machines' (IBM) DB2®, Microsoft's® SQL Server, and database products from Oracle®, Sybase®, and Computer Associates®. The term "query" referrers to a set of commands composed to retrieve data from a stored database. Queries take the form of a command language that lets programmers and programs select, insert, update, determine the location of data, and the like.

One area where databases are extensively used is in the area of research. Modern research is a daunting task for researchers. Research may require expensive lab equipment, long hours of testing theories, and time spent analyzing results. Researchers may be presented with a variety of computational resources and research methods with which they may conduct their research. In conducting research, the researcher may narrow the possibilities for research methods and resource use to a selected few resources and methods. Each of the methods and resources selected by the researcher may be particular to the research being conducted.

Modern research may also be extremely expensive, both in terms of the cost of the research equipment and the cost of the time spent by the research in conducting research. Due to the expense of modern research, researchers are constantly looking for ways to reduce the costs of research. The institutions and corporations that conduct major research projects may also wish to reduce the costs associated with research. One of the ways to reduce the costs of research may be for researchers to share the equipment and analytical tools being used for research. Thus, if two researchers need to use the same device, and if neither researcher needs to monopolize the use of the device, the researchers may split the cost of purchasing and using the device and share the device for use in their research.

Another way to reduce the costs of research may be to avoid duplicative research efforts by researchers. For instance, if two researchers are studying similar problems, a portion or all of their research efforts being used to study the problems may overlap. By sharing data regarding the areas of overlap, or by combining their common knowledge, the researchers may eliminate all or a portion of the duplicative research and split the cost of the common research. By sharing information regarding the non-duplicative aspects of their research, the researchers may discover new problems and new solutions which each researcher may not have discovered while working alone. Indeed, where researchers studying two different problems use the same research tools and generate the same research data, if the researchers were informed of each other's research, they may discover that the two different problems are in fact related. For instance, where two researchers are studying two diseases believed to be distinct and both researchers use the same research tools and generate similar research data, the researchers, upon being informed of each other's research, may discover that the diseases they are studying are related, either because one diseases causes the other, because the diseases are spread in the same manner, or because the two diseases are both caused by a common, but undiscovered disease.

Despite the advantages which may be gained by sharing resources and eliminating duplicative research efforts, researches may still face the task of discovering other researchers with whom they may share resources and discovering and avoiding duplicative research efforts. Discovering other researchers conducting similar research may be difficult because research on new subjects may last several years with the results remaining unpublished until the research has concluded. In addition, researchers may guard their research to avoid the risk of having others take their ideas.

One way of identifying researchers conducting similar research may be to analyze each researcher's use of a database for conducting research. The database used by a researcher may provide a centralized point for collecting and analyzing information about the research being conducted by a researcher. In both research and fields other than research, comparing database searches may help searchers avoid duplicative efforts and share resources as well. Therefore, what is needed is a method for identifying related database search efforts and a mechanism for notifying independent searchers of the similarity of their respective searches.

SUMMARY OF THE INVENTION

The present invention generally provides methods for comparing query-related objects. One embodiment provides for receiving a first plurality of query-related objects for a first user, receiving a second plurality of query-related objects for a second user, wherein both the first and second plurality of query-related objects include objects of different object types. The first plurality of query-related objects of a given type are compared with the second plurality of query-related object of the same type to determine a degree of similarity between the first and second plurality of query-related objects, and issuing a notification of the degree of similarity.

Another embodiment provides a method for comparing query-related objects. The method generally includes providing a data abstraction layer which defines one or more logical fields, wherein a definition for each logical field specifies (i) a name, and (ii) an access method that maps the logical field to data in an underlying data repository. The method further generally includes receiving from a first user a first abstract query composed from the one or more logical fields defined in the data abstraction layer, receiving from a second user a second abstract query composed from the one or more logical fields defined in the data abstraction layer, comparing the first abstract query and the second abstract query to determine a degree of similarity, and issuing a notification of the degree of similarity.

Yet another embodiment provides a method for comparing query-related objects. The method provides for receiving a plurality of query-related objects of two or more object types, each query-related object having a different owner, sorting the plurality of query-related objects according to the two or more object types, calculating a degree of similarity of the sorted query-related objects of each of the two or more object types, determining if the calculated degree of similarity of the sorted query-related objects is above a threshold for similarity. For those sorted query-related objects having the calculated degree of similarity above the threshold for similarity, the method further generally provides for selecting pairs of query-related objects with different owners having a predetermined degree of association, grouping the selected pairs of query-related objects by the owners of the query-related objects, and ranking the grouped pairs of query-related objects based upon the number of selected pairs of query-related objects within the group.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 10 is a diagram depicting a graphical user interface for displaying a list of comparison results according to one embodiment of the invention.

DETAILED DESCRIPTION OF THE PREFERRED EMBODIMENTS

Figure 1:
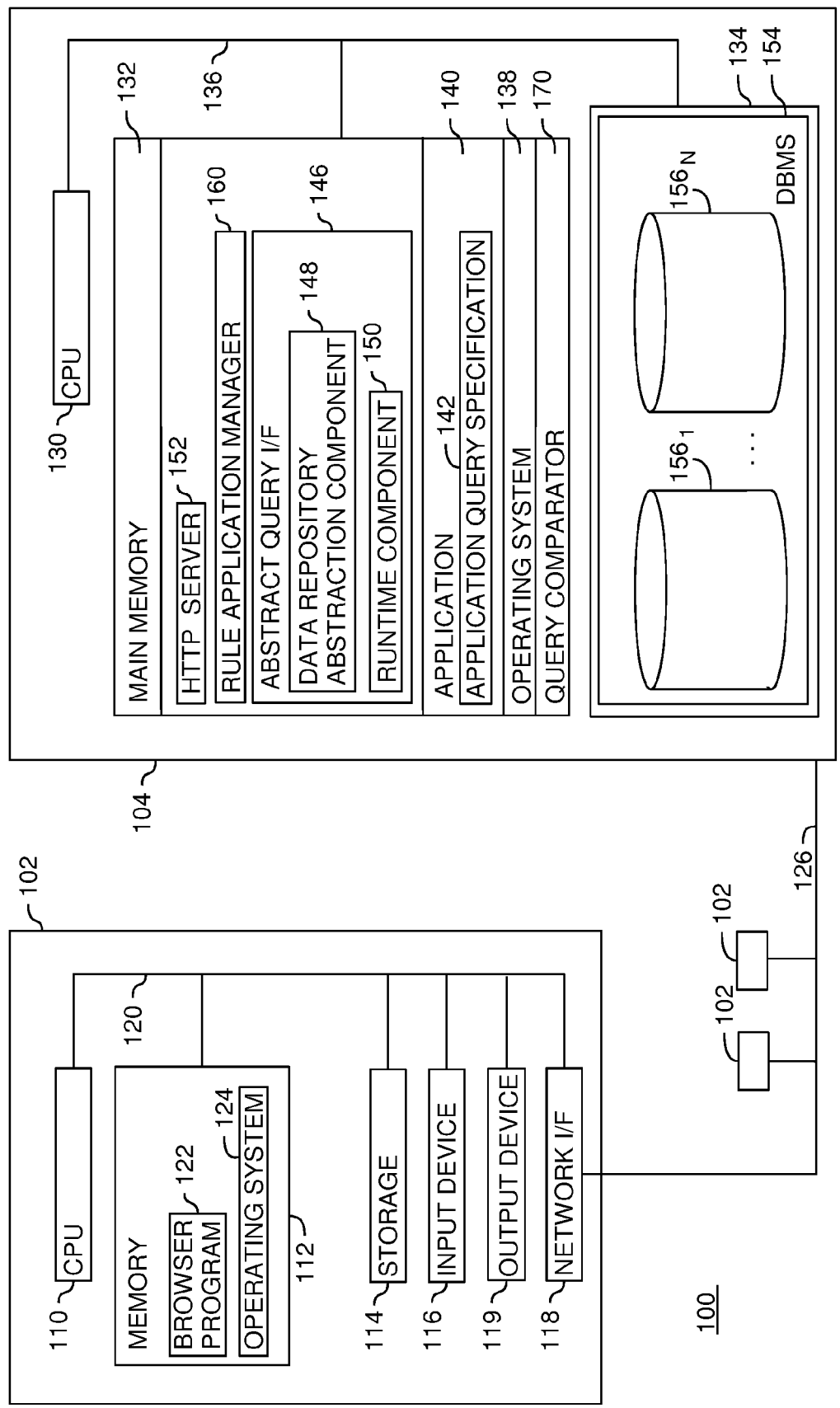
FIG. 1 is one embodiment of a computer system utilized in accordance with the invention.

The present invention is generally directed to a method comparing query-related objects. In general, a first plurality of query-related objects is received for a first user and a second plurality of query-related objects is received for a second user. The first plurality of query-related objects is compared with the second plurality of query-related object to determine a degree of similarity between the first and second plurality of query-related objects and a notification of the degree of similarity is issued. Accordingly, users conducting similar research in a database environment may be notified of the similarity of their research.

While embodiments of the present invention are described with reference to the comparison of the research of two or more researchers, embodiments of the invention may be used to compare any queries, including queries unrelated to any specific research. According to other embodiments of the invention, the queries being compared may be generated by a regular user, by an application, by an administrator, or by any method known to those skilled in the art. While embodiments of the invention may be described with reference to comparison of two queries from two researchers, other embodiments of the invention may provide for the comparison of multiple queries from multiple researchers. Furthermore, while embodiments of the invention are described below with reference to a database system utilizing an abstract query framework, embodiments of the invention may also be used in systems which do not utilize an abstract query framework.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104 is shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140, an abstract query interface 146 and a rule application manager 160. The applications 140, the abstract query interface 146 and the rule application manager 160 are software products having a plurality of instructions that are resident at various times in various memory and storage devices in the computer system 100. When read and executed by one or more processors 130 in the server 104, the applications 140, the abstract query interface 146 and the rule application manager 160 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) 154 in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The memory 132 may also include a query comparator 170 according to one embodiment of the invention. The query comparator 170 may be used to compare two or more abstract queries received by the server computer 104. The query comparator 170 is described below in greater detail with reference to FIGS. 7-8.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154, e.g., by translating abstract queries into concrete queries. The rule application manager 160 implements a rule application mechanism for restricting queryable data to a subset of all available data contained in the DBMS 154. In one embodiment, the rule application manager 160 restricts the queryable data by redefining a query that is executed against the database in order to execute the redefined query against the queryable data. Alternatively, the rule application manager 160 restricts the queryable data using a condition retrieved from storage when executing a received query. Still alternatively, the rule application manager 160 restricts the queryable data by modifying the data repository abstraction component. The application query specification 142, the abstract query interface 146 and the rule application manager 160 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (HTTP) server process 152 (e.g., a web server) adapted to service requests from the client computer 102. For example, the process 152 may respond to requests to access a database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative and other embodiments adapted to support any known and unknown protocols are contemplated.

Logical/Runtime View of Environment

Figure 2A:
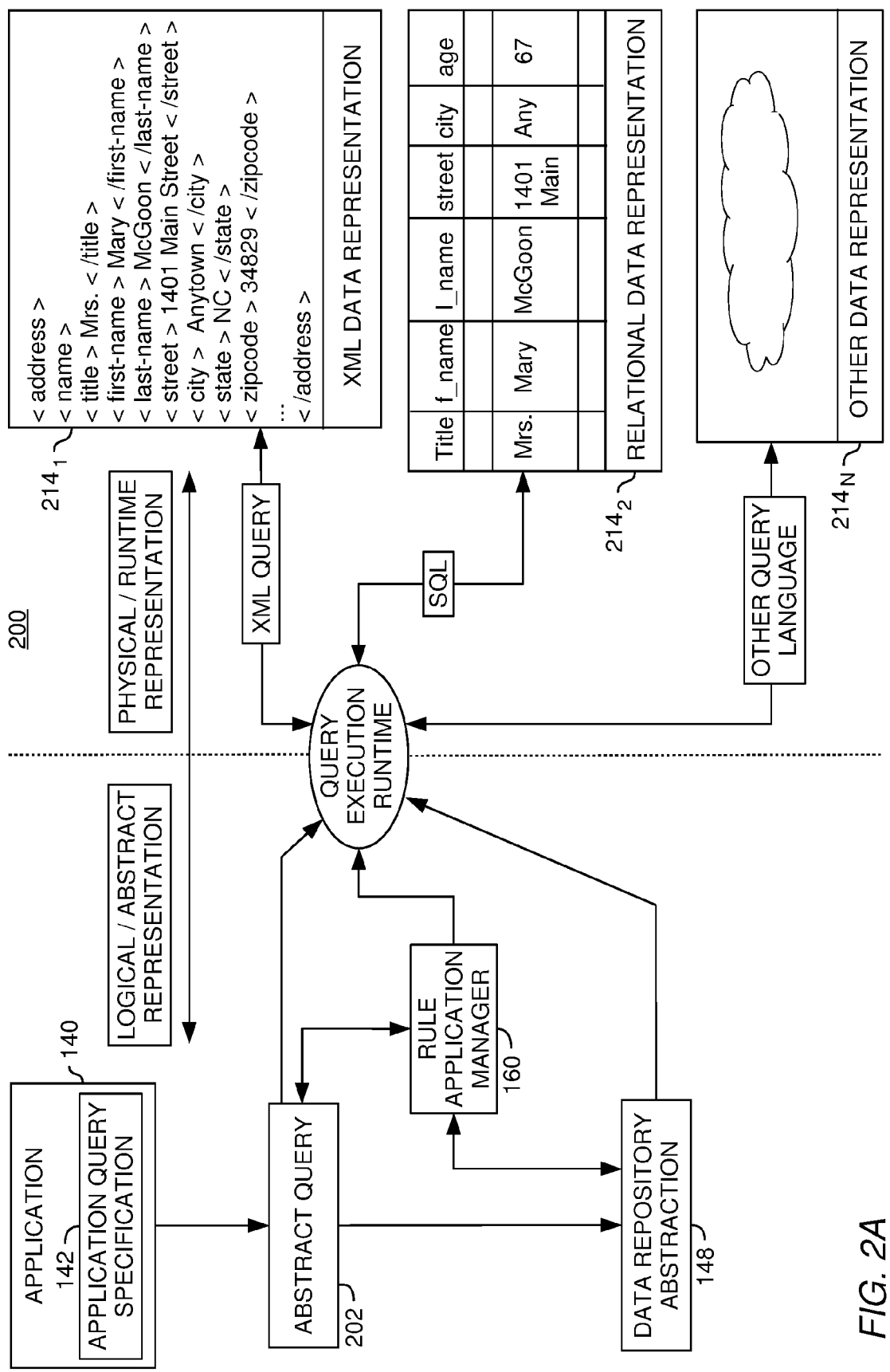
FIGS. 2A-B are relational views of software components of one embodiment of the invention.
Figure 2B:
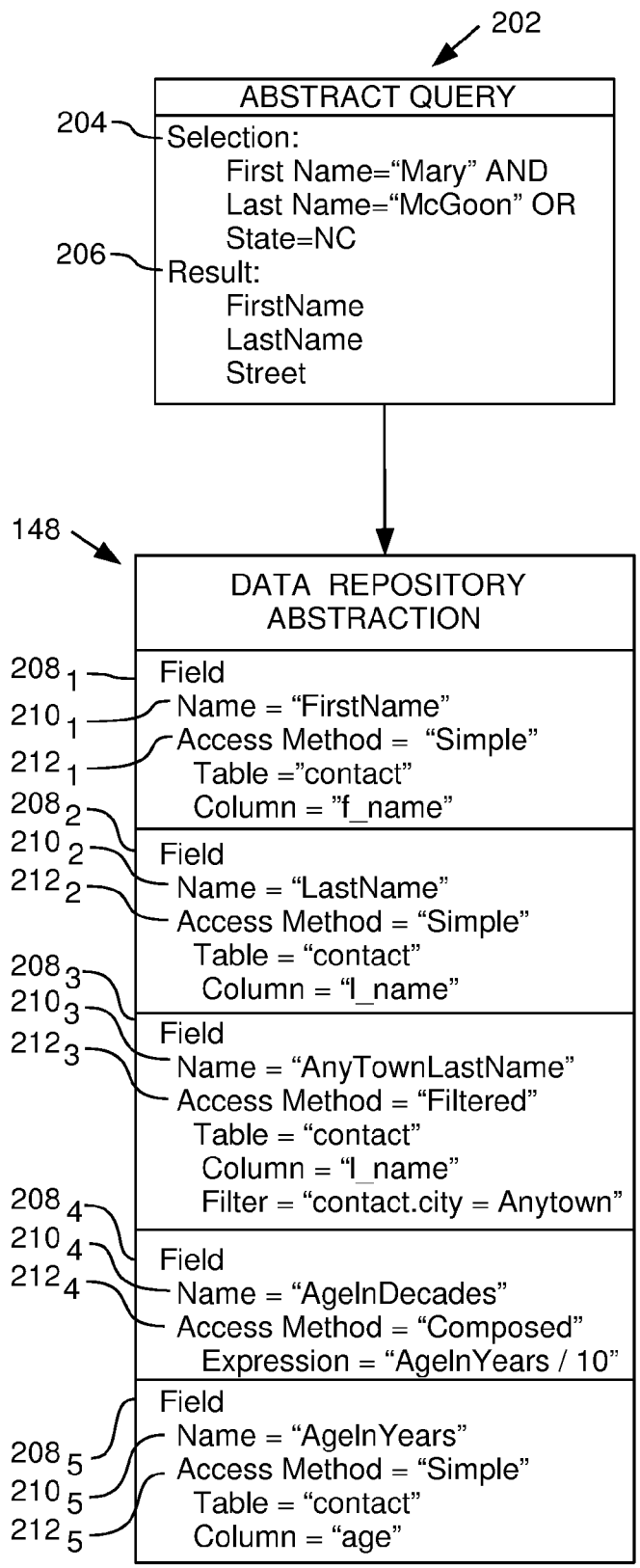

FIGS. 2A-B show an illustrative relational view 200 of components of the invention. A requesting entity (e.g., one of the applications 140 of FIG. 1) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the database 156, thereby allowing queries to be formed that are loosely coupled to the underlying data representation.

In one embodiment, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification contains a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in the database (e.g., database 156). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 148 contains field specifications (with associated access methods) for two or more physical data representations 214. In an alternative embodiment, a different single data repository abstraction component 148 is provided for each separate physical data representation 214.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide filters used to define a particular subset of items within the physical data representation. An example is provided in FIG. 2B in which the filtered field access method $212_3$ maps the logical field name $210_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_4$ maps the logical field name $210_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

An illustrative abstract query corresponding to the abstract query 202 shown in FIG. 2B is shown in Table I below. By way of illustration, the illustrative abstract query is defined using XML. However, any other language may be used to advantage.

TABLE I

ABSTRACT QUERY EXAMPLE

```
001    <?xml version="1.0"?>
002    <!--Query string representation: (FirstName = "Mary" AND LastName=
003    "McGoon") OR State = "NC"-->
004    <QueryAbstraction>
005        <Selection>
006            <Condition internalID="4">
007                <Condition field="FirstName" operator="EQ" value="Mary"
008    internalID="1"/>
009                <Condition field="LastName" operator="EQ" value="McGoon"
010    internalID="3" relOperator="AND"></Condition>
011            </Condition>
012            <Condition field="State" operator="EQ" value="NC" internalID="2"
013    relOperator="OR"></Condition>
014        </Selection>
015        <Results>
016            <Field name="FirstName"/>
017            <Field name="LastName"/>
018            <Field name="State"/>
019        </Results>
020    </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative Data Repository Abstraction is shown in Table II below. By way of illustration, the illustrative Data Repository Abstraction is defined using XML. However, any other language may be used to advantage.

TABLE II

DATA REPOSITORY ABSTRACTION EXAMPLE

```
001    <?xml version="1.0"?>
002    <DataRepository>
003        <Category name="Demographic">
004            <Field queryable="Yes" name="FirstName" displayable="Yes">
005                <AccessMethod>
006                    <Simple columnName="f_name" tableName="contact"></Simple>
007                </AccessMethod>
008                <Type baseType="char"></Type>
```

TABLE II-continued

DATA REPOSITORY ABSTRACTION EXAMPLE

```
009            </Field>
010            <Field queryable="Yes" name="LastName" displayable="Yes">
011               <AccessMethod>
012                  <Simple columnName="l_name" tableName="contact"></Simple>
013               </AccessMethod>
014               <Type baseType="char"></Type>
015            </Field>
016            <Field queryable="Yes" name="State" displayable="Yes">
017               <AccessMethod>
018                  <Simple columnName="state" tableName="contact"></Simple>
019               </AccessMethod>
020               <Type baseType="char"></Type>
021            </Field>
022         </Category>
023      </DataRepository>
```

Figure 3:
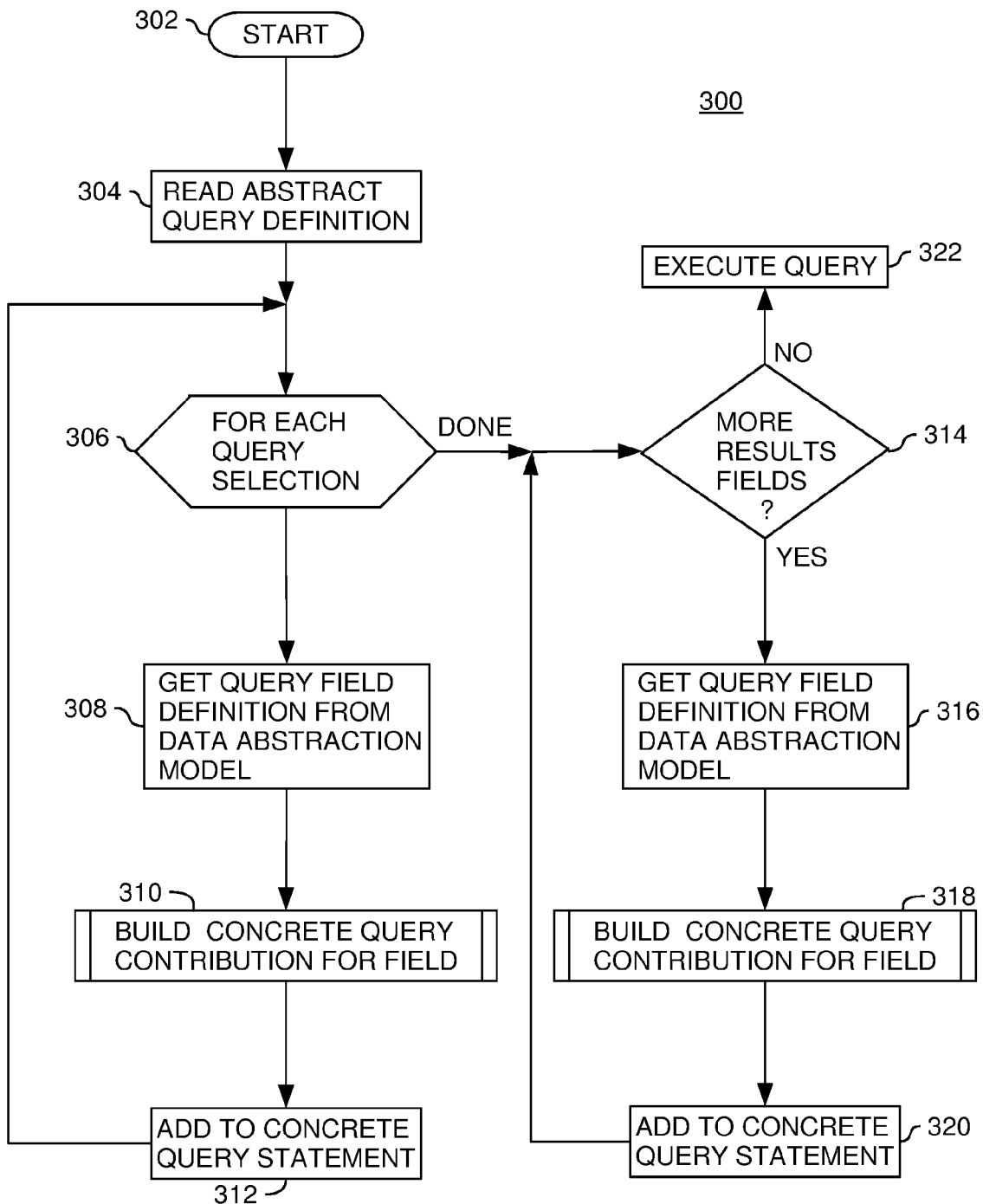
FIG. 3 is a flow chart illustrating the operation of a runtime component according to one embodiment of the invention.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
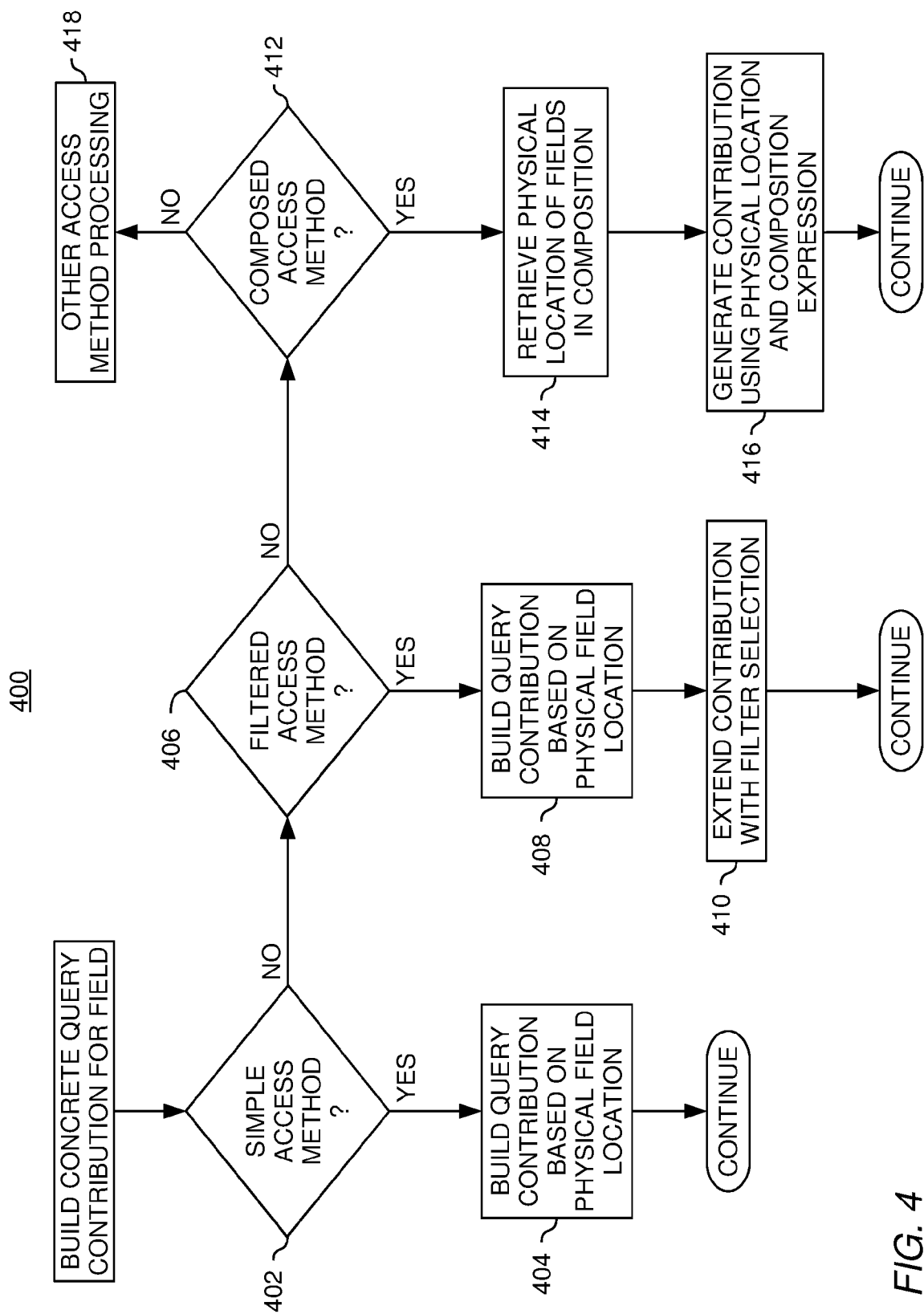
FIG. 4 is a flow chart illustrating the operation of a runtime component according to one embodiment of the invention.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Figure 5A:
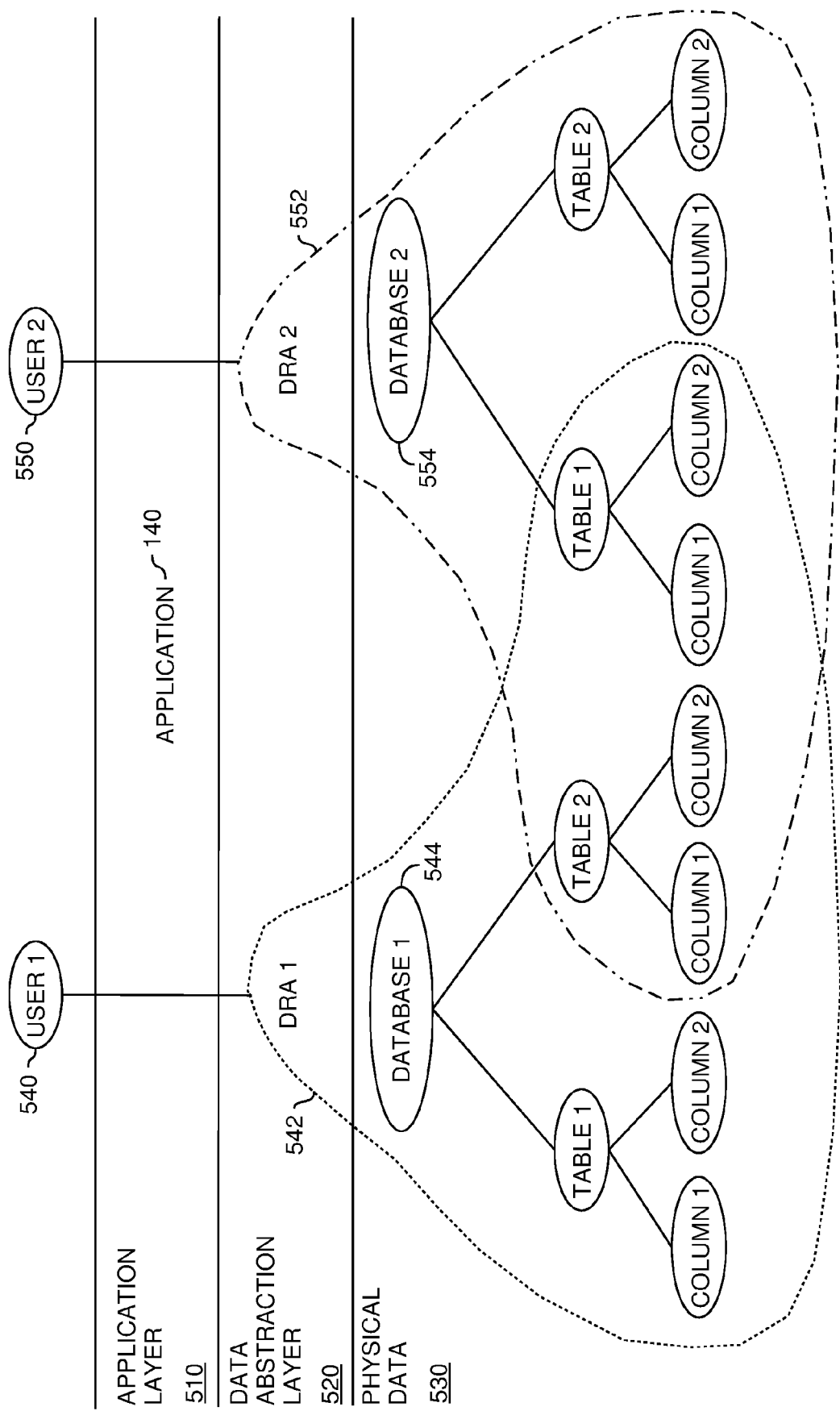
FIG. 5A illustrates one embodiment in which multiple data repository abstraction components coexist in a single application space according to one embodiment of the invention.

According to one embodiment of the invention, each user may submit abstract queries which are transformed into concrete queries using different database repository abstractions. FIG. 5A illustrates such an environment. The environment shown in FIG. 5A generally comprises an application layer 510 (defined by the application 140), a data abstraction layer 520, and a physical data layer 530. The environment shows two users 540, 550 accessing the physical data layer 530 via the application layer 520 using, e.g., application 140 of FIG. 1 (e.g., by issuing abstract query 202 of FIG. 2). Accordingly, the application layer 520 may comprise a data query builder component adapted to enable the users to build abstract queries.

The users 540, 550 access the same physical data layer 530 through a common application layer 520. However, the data being exposed to the respective users 540, 550 is not the same. Rather, each user is exposed to selected portions of the physical data layer 530 according to the definition of the data abstraction layer 520. More particularly, the data abstraction layer 520 illustratively includes two data repository abstraction components, DRA1 542 and DRA2 552, which define the data that will be exposed to the users 540, 550, respectively, via the application layer 510. The data abstraction layer 520 may comprise a data query abstraction component which services logical data access of the data query builder component to the physical data in physical data layer 530.

In the present example, the first data repository abstraction 542 (DRA1) exposes all of a first database 544 and TABLE 1 of a second database 554, while the second data repository abstraction 552 (DRA2) exposes the entire second database 554 and TABLE 2 of the first database 544. It should be noted that the particular data exposed by the respective data repository abstraction components is merely illustrative. More generally, any portion of the databases 544, 554 may be exposed, as well as any other databases of the physical data layer 530. By way of illustration, the environment of FIG. 5A shows two users (540, 550). However, more generally any number of users may be accessing the data of the physical data layer 530.

Figure 5B:
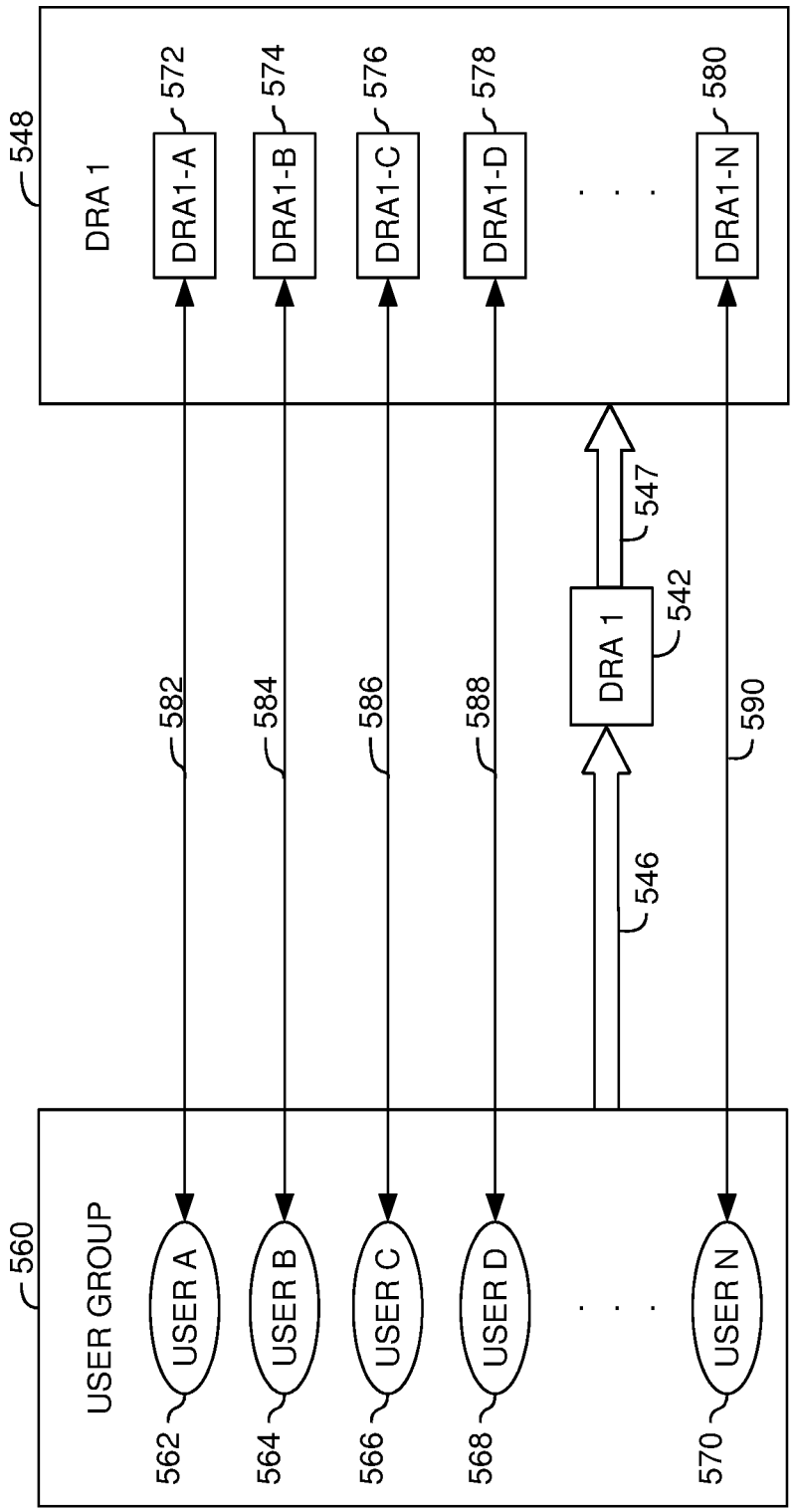
FIG. 5B illustrates one embodiment in which multiple instances of a single data repository abstraction component coexist in a single application space according to one embodiment of the invention.

Referring now to FIG. 5B, an embodiment in which multiple instances of a single data repository abstraction component (e.g. data repository abstraction component 148) coexist in a single application space is illustrated. According to FIG. 5B, a group 560 of users 562 (USER A), 564 (USER B), 566 (USER C), 568 (USER D), . . . , 570 (USER N) accesses (as illustrated by arrow 546) a single data repository abstraction 542, independent of whether only one or a plurality of data repository abstractions exist. In the present illustration, all users of the group 560 of users access data repository abstraction DRA1.

For each user 562, 564, 566, 568, . . . , 570 accessing the data repository abstraction 542 (DRA1), an instance of the data repository abstraction 542 is generated (as indicated by arrow 547), thereby generating a group 548 of data repository abstraction instances. Accordingly, instances 572 (DRA1-A), 574 (DRA1-B), 576 (DRA1-C), 578 (DRA1-D), . . . , 580 (DRA1-N) are generated for the users 562, 564, 566, 568, . . . , 570, respectively, as indicated by arrows 582, 584, 586, 588 and 590. Providing an instance of the data repository abstraction 542 for each user allows adapting a corresponding instance to the needs and specific requirements of the user without globally changing the data repository abstraction 542 for all users in the group 560.

Figure 6:
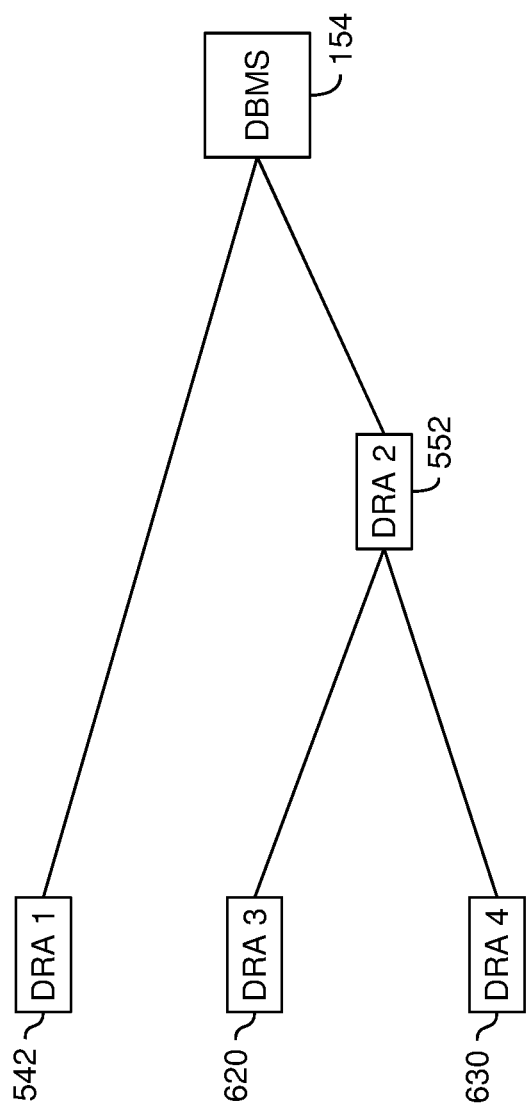
FIG. 6 illustrates an environment with plural data repository abstraction components according to one embodiment of the invention.

FIG. 6 illustrates an embodiment in which a plurality of data repository abstraction components reference one another. Specifically, the second data repository abstraction component DRA2 552 of FIG. 5A is illustrated as a parent with respect to a third data repository abstraction component DRA3 620 (a child) and a fourth data repository abstraction component DRA4 630. In this relationship, the third and/or fourth data repository abstraction components DRA3 620, DRA4 630 may inherit a portion of the definition of the second data repository abstraction component DRA2 552. In more detail, a portion of the logical fields provided in the second data repository abstraction component DRA2 552, which is not comprised in the third and/or fourth data repository abstraction components DRA3 620, DRA4 630, may be included therein by inheritance. Alternatively, the third and/or fourth data repository abstraction component DRA3 620, DRA4 630 may override portions of the second data repository abstraction component DRA2 552 and/or include additional definitions, e.g., logical fields not found in the second data repository extraction component DRA2 552. Still alternatively, the second data repository abstraction component DRA2 552 may be constructed by a combination of the definitions and/or logical fields comprised in the third and fourth data repository abstraction components DRA3 620, DRA4 630.

Users may have different database repository abstractions for several reasons. For instance, a user may have a customized DRA which only exposes limited, relevant portions of an underlying database to the user. Each user may also have different DRAs because the underlying database being used by each user may be stored using a different physical data representation or in a different format. For instance, the underlying data for each database may be stored in different tables with different column names. In another instance, the information accessed by one user may be stored in an XML schema whereas the information accessed by another user may be stored in a relation schema (accessible by SQL queries). Also, each DRA may be used to access a completely different database. In general, each different database being accessed by the user may also be located on different computers owned by the same company or may be located at different places and owned by different companies.

Data repository abstractions may also be used in conjunction with views. A view may be used as a filter which resides above a DRA to expose a selected portion of the DRA to a user or to modify or redefine the logical fields in a DRA according to the user's preferences. For instance, where a DRA contains a logical field named 'gender', a view may be used to redefine the logical field and allow the user to access that field through a new field named 'sex'. A view may be implemented in any way known to those skilled in the art.

Comparison of Research in a Database System

According to one embodiment of the invention, queries, query results, and result analysis routines from two or more different researchers may be compared to determine if the researchers are conducting similar research. The queries being compared may either be concrete queries, abstract queries, or any other type of query known to those skilled in the art. The comparison of queries, results, and analyses may be performed on data in the form of query-related objects. The term object, as used herein, may refer to a file, an entry in a data file, an entry in a log file, a data structure, a stream of status messages, or any other means used to store or transmit information known to those skilled in the art. Each query-related object may be of a certain type according to the information conveyed in the object. Thus, object types may include query objects, result objects, and analysis objects.

Figure 7:
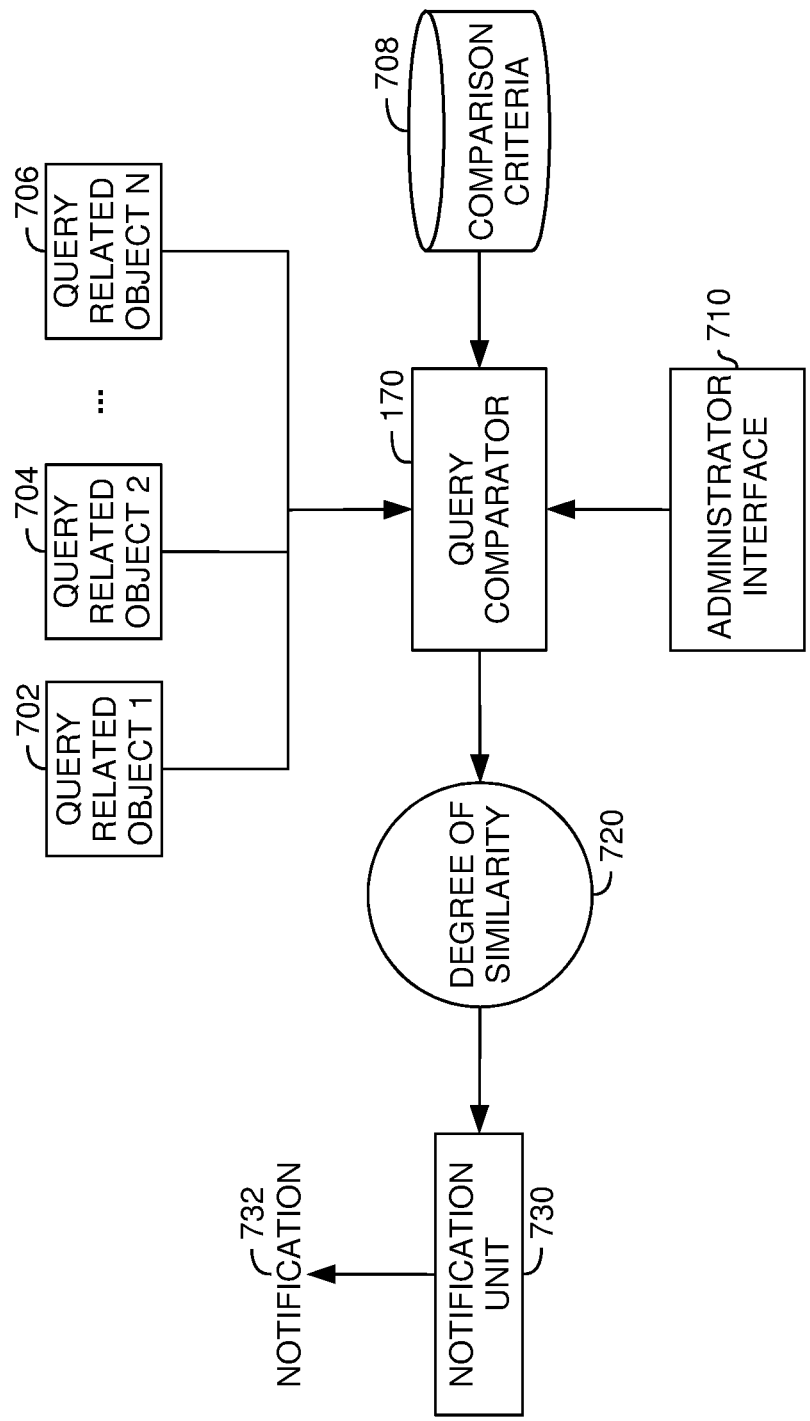
FIG. 7 is a flow diagram illustrating components for comparing two or more query-related objects according to one embodiment of the invention.

FIG. 7 is a block diagram illustrating components for comparing two or more query-related objects according to one embodiment of the invention. The query comparator 170 may be used to compare a first query-related object 702, a second query-related object 704, and other query-related objects 706 according to one embodiment of the invention. An administrator interface 710 allows the query comparator 170 to be accessed and controlled, and allows options for the comparator 170 may be modified. The query-related objects 702, 704, 706 received by the query comparator 170 may contain queries, results of the queries, and/or the analyses performed on the results of each of the queries, as well as other artifacts derived from the execution of the queries. After receiving the query-related objects 702, 704, 706, the query comparator may use comparison criteria 708 to determine a degree of similarity 720 of each of the abstract queries, query results, and result analyses contained in the objects. The query comparator may also be used to rank the results of the comparisons based on the comparison criteria 708. To this end, the comparison criteria 708 may contain rules or guidelines which may be used by the query comparator 170 to determine the degree of similarity 720 and rank the results of the comparisons. The nature and derivation of these rules and guidelines is described bellow in greater detail. If the degree of similarity 720 is significant, a notification unit 730 may then display a notification 732. The significance of the degree of similarity 720 may turn upon whether the degree of similarity 720 is above a threshold of similarity (also described below). A separate notification 732 may be sent for each pair of similar objects, or the notification may contain information about each of the pairs of similar objects displayed, for instance, in a ranked list. According to other embodiments of the invention, the notification may contain other information in other arrangements known to those skilled in the art.

Figure 8:
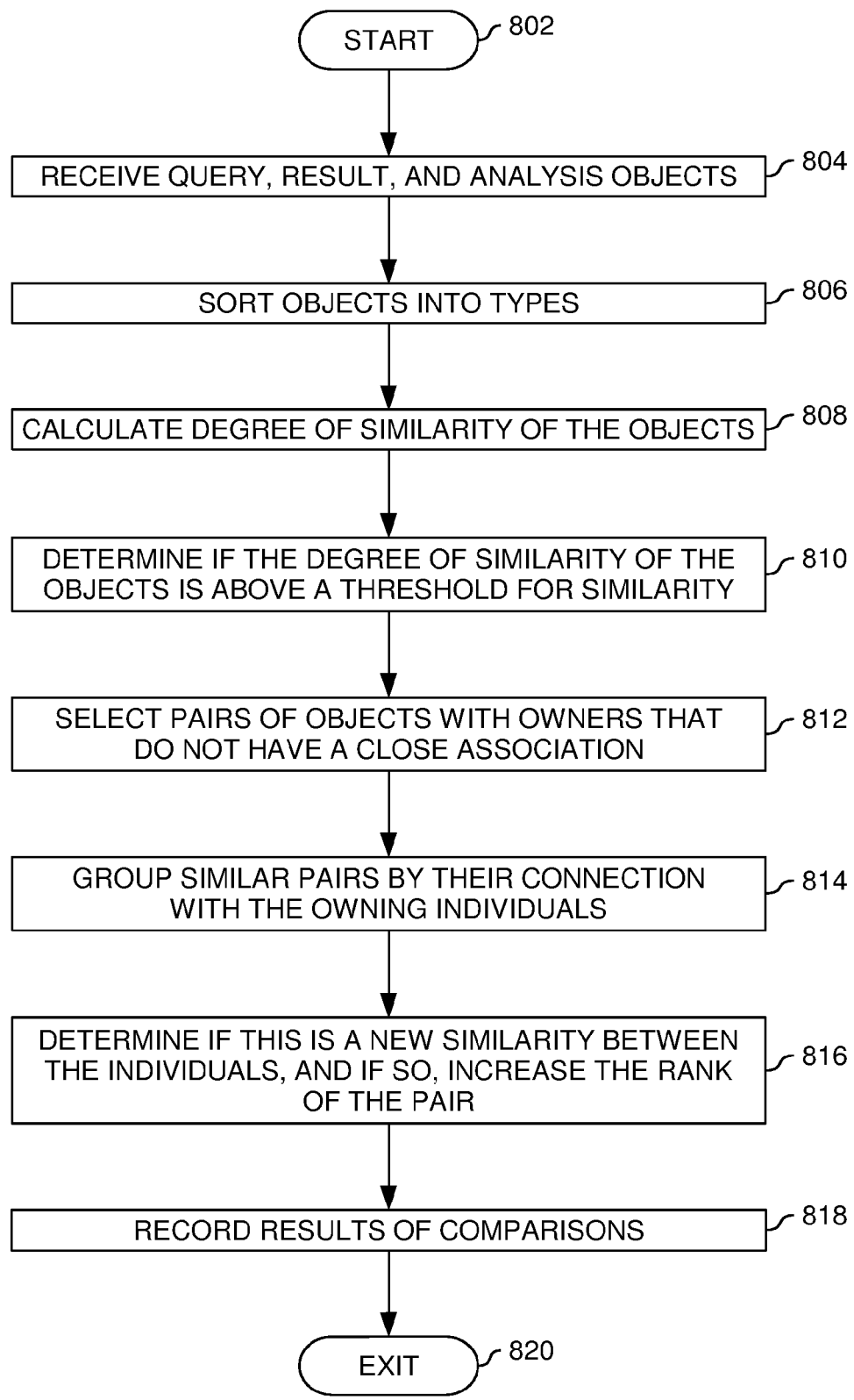
FIG. 8 is a flow diagram depicting a process for comparing two or more query-related objects according to one embodiment of the invention.

FIG. 8 is a flow diagram depicting a process 800 for comparing two or more query-related objects according to one embodiment of the invention. The process 800 may begin at step 802 and continue to step 804 where objects containing query conditions, query results, and result analyses are received. At step 806 the objects may be sorted according to their respective object types. As a result of sorting, the query objects, query result objects, and result analysis objects may be grouped together in three respective groups. Sorting the objects according to the object type may ensure that like objects are compared to like objects (e.g. that result analysis objects are compared to result analysis objects). At step 808 a degree of similarity of each of the objects may be calculated. The degree of similarity may be a value or a group of values which represents the similarity between each of the objects. At step 810 a determination may be made of whether the degree of similarity is above a threshold for similarity. Generally, the threshold for similarity may represent what degree of similarity is necessary for the query-related objects to be considered significantly similar where significance may represent a similarity which is above and beyond the similarity normally expected between any two query-related objects in the system. Thus, the threshold may be set above the degree of similarity which is typical or expected for objects contained in a given system. The threshold of similarity may be chosen by an administrator or a user. The threshold may also be chosen by using statistics (which may include means, medians, standard deviations, and grouping algorithms) to derive a value, or in any other way known to those skilled in the art.

At step 812, pairs of objects with owners that do not have a close association may be selected. The owner of an object may be the researcher or user which is executing the query, obtaining the results, and performing analyses on the results. Information about the owner of an object may be contained in the object, in a message accompanying the object, or may be transmitted in any way known to those skilled in the art. Pairs of objects with owners that do have a close association may be ignored because those owners having a close association may be aware of each other's research and may not need to be notified of the similarity of their respective research. For instance, such a situation may arise where researchers work in the same laboratory or report to the same authority. Information about whether owners of the objects have a close association may be stored in the comparison criteria 708, may be entered using the administrator interface 710, may be provided with the objects, or may be provided by any other means known to those skilled in the art.

At step 814, similar pairs of objects may be grouped according to their connection with the owning individuals and a rank may be assigned to the group. Thus, if two researchers have two similar pairs of objects in common, those two pairs of four objects would be grouped together. The number of similar pairs of objects grouped together may be used to assign a rank to the group. For instance, if two pairs of objects are similar for a first group of researchers, the group of two pairs may be ranked higher than a singular pair of similar objects for a second group of researchers.

As an example of how a rank may be assigned to pairs of objects for a group of researchers, consider the following exemplary query-related object groupings.

TABLE III

EXEMPLARY QUERY RELATED OBJECT GROUPINGS

1. Joe Morgan/Bill Meyers Group
  2 query objects in common.
  3 result objects in common.
  1 analysis object in common.
2. Jane Caruthers/Jack Johnson Group
  1 query object in common.
  2 result objects in common.
  1 analysis object in common.
3. Janet Brady/Charles Mahoney Group
  1 query object in common.
  1 result object in common.
  No analysis objects in common.

Table IV contains rankings for three groupings of researcher queries. The highest ranked group (Joe Morgan/Bill Meyers) has the largest number of similar object pairs in common with six total similar pairs (two query pairs, three results pairs, and one analysis pair). The lower ranked groups (Jane Caruthers/Jack Johnson and Janet Brady/Charles Mahoney) have fewer similar pairs in common (four similar pairs for Jane Caruthers/Jack Johnson and two similar pairs for Janet Brady/Charles Mahoney). According to another embodiment of the invention, the rank may also incorporate the degree of similarity of the objects. For instance, a higher degree of similarity of a pair of objects may contribute more to the rank than a lower degree of similarity.

At step 816, a determination may be made of whether there is a new similarity (i.e., a previously undiscovered similarity) between object pairs, and if so, the rank of the group containing the pair may be increased. Thus, if a new similarity between the research being performed by the researchers is discovered, the increased rank may be used to display the new similarity to the researchers first in a ranked list of the results and older similarities that the researcher may already have reviewed may be placed lower in a ranked list of the results. In one embodiment, information regarding whether a similarity is new or old may be stored in the comparison criteria 708, using the objects, or in any other manner known to those skilled in the art. At step 818, the results of the comparisons may then be recorded. The results of the comparisons may be recorded for future analysis of the results, to determine which pairs of similar objects are new in future runs, and for later retrieval by an administrator or user. Then, at step 820, the process 800 may finish.

The comparison of queries (performed, according to one embodiment of the invention, by the process 800) may be performed at different times according to different embodiments of the invention. According to one embodiment of the invention, the comparison may be performed as each abstract query is received. According to another embodiment of the invention, the comparison may be performed at off-peak times when the system is not being utilized by other processes. For instance, the comparison may be performed late at night after the researchers have left work and when no queries are being submitted. According to yet another embodiment of the invention, the comparison may be performed upon receiving a request from a user or administrator.

The similarity between the two query-related objects may be determined in different ways according to different embodiments of the invention. In one embodiment, the similarity between two query-related objects may be measured by comparing two query-related objects to each other. In another embodiment, the similarity between the query-related objects may alternatively be measured by comparing the objects with respect to how they deviate from other query-related objects in the database system.

Where two query-related objects are compared with respect to how they differ from other query-related objects, the other query-related objects being compared may be collectively represented by objects which are typical for query conditions, query results, and analyses in a system. A query-related object may be typical in a system because it occurs frequently within the system. These objects may be selected by statistically analyzing of all of the queries, results, and analyses in a system to determine common queries, results, and analyses used in the system. Use of these objects in comparison of the abstract queries is described in greater detail below. The query-related objects may also be compared with respect to how they deviate from a query-related object drawn at random from the system.

Figure 9:
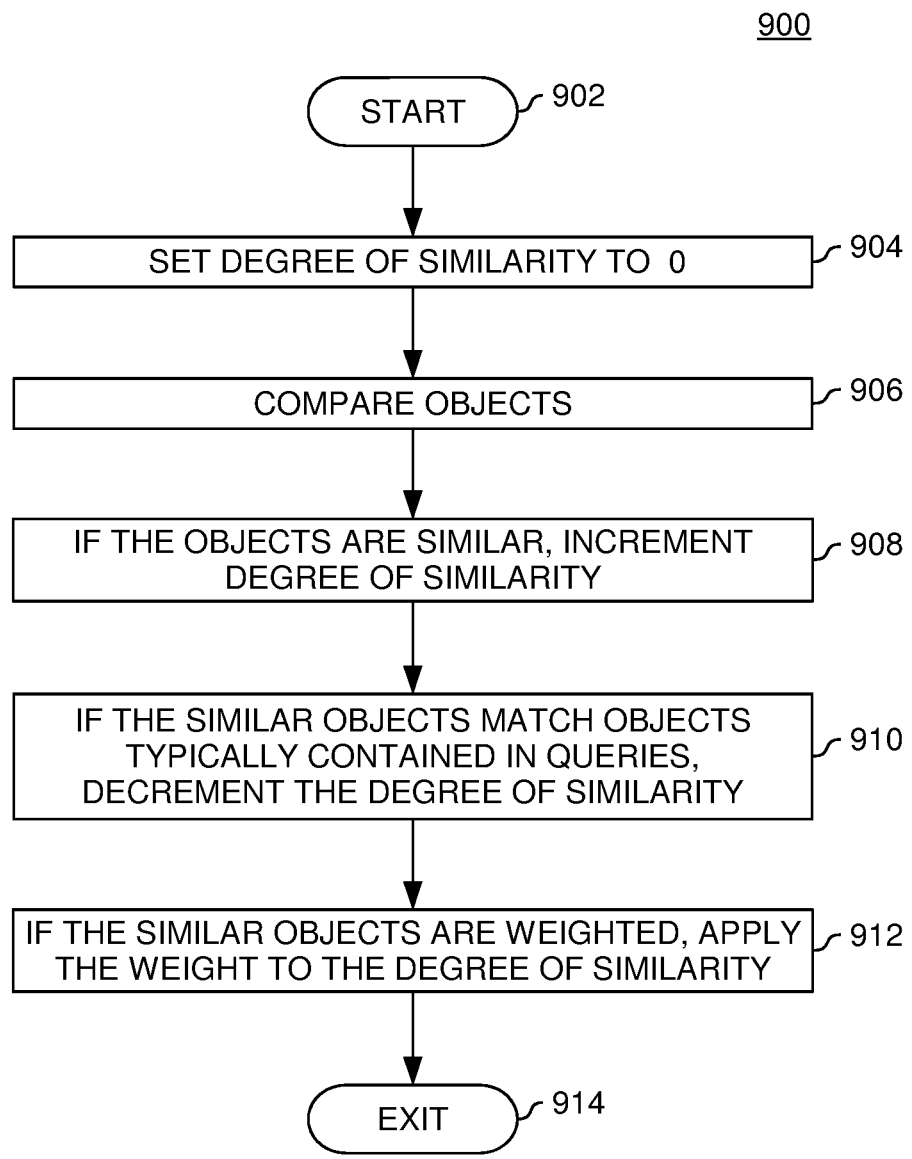
FIG. 9 is a flow diagram depicting a process 900 comparing two query-related objects according to one embodiment of the invention.

FIG. 9 depicts a process 900 for comparing two query-related objects according to one embodiment of the invention. The process begins at step 902 and continues to step 904 where the degree of similarity of the query-related objects is set to 0 for the new comparison. At step 906, the query-related objects may be compared to each other to determine if they are similar. The comparison may include a direct textual comparison of the contents of the objects, a statistical comparison, or any other comparison method known to those skilled in the art. The comparison may also be performed with respect to component parts of each object. In general, a component part of an object may be any subset of the information contained in that object. For instance, the component parts of an abstract query object may be condition fields and result fields contained in the abstract query. The component parts of a results object may include individual results or other selections of data contained in the results. The component parts of an analysis object may include an identifier for the analysis being performed and parameter settings for the analysis being performed.

If the objects being compared are similar, the degree of similarity may be incremented at step 908. If, however, the similar objects match an object which is typically contained in queries in the system, the degree of similarity may be decremented at step 910. The degree of similarity may be decremented when the objects are similar to another object typically appearing in the system because the match may not be considered very unique or significant where the object is expected to appear frequently. For example, consider a research environment in which 90% of all queries contain a patient identifier. In this case, the patient identifier is common to almost all queries and not a good indication that any two given queries may be similar. On the other hand, queries in the same environment not including the patient identifier may be considered to have possible similarity, in which case the degree of similarity is incremented at step 908 and not decremented at step 910. At step 912, any weights associated with the objects being compared may be applied to the degree of similarity. For instance, if the two objects are highly unique in the system, a higher weight may be assigned to the objects and the degree of similarity may be increased because of the probability of such objects being contained in other queries in the system (assigning weights to objects is described below in greater detail). At step 914, the process 900 may finish.

As an example of how objects relating to two abstract queries, results, and analyses may be compared, consider the following exemplary query-related objects and exemplary objects representing the typical abstract query in a system.

TABLE IV

EXEMPLARY RESEARCH COMPARISON INFORMATION

| Query-Related Objects | Set 1 | Set 2 | Objects Representing the Typical Abstract Query In the System |
|---|---|---|---|
| Abstract Queries: | Find ID, Weight where Age > 40 AND Hair Color = 'Brown' | Find ID, Weight where Age > 40 AND Blood Type = 'AB+' | Find ID |
| Query Results: (ID Number, Weight) | 23, 205 48, 153 56, 185 | 23, 205 48, 153 60, 230 | 23, 205 |
| Results Analysis: | Linear Regression on Weight | Linear Regression on Weight | No Statistical Convergence |

The information in Table IV is divided into three sets/columns. The first set and second set contain exemplary abstract queries run by two different researchers, along with the results of the abstract queries and the analysis performed by the researchers on the abstract query results.

The final column contains objects which represent a statistical average of all of the abstract queries, query results, and results analyses which have been run on the system. For instance, the average abstract query run on the system may contain a query condition which requests the "ID" field and the average abstract query may have query results which include ID number 23. Thus, while not all abstract queries executed by researchers may request that the ID field be returned in the results, many researchers may use the ID field for further analysis and thus request the ID field. Accordingly, a statistical analysis of all of the queries in the system may show that the ID field is requested by the average abstract query being executed by the system. However, the statistical analysis of the queries in the system may not give a statistically meaningful result with respect to each category of object, and thus, for example, there may be no statistical convergence with respect to the average analysis run by a researcher executing abstract queries in the system. This may be due to the fact that the analyses used by each researcher are very specialized and thus may not be executed by the average query being executed in the system.

Where a set of objects representing two abstract queries, results, and analyses are compared directly with each other, the overall similarity may be calculated in the following manner according to one embodiment of the invention. Because the first abstract query and the second abstract query contain 3 components in common (both request "ID" and "Weight" where "Age>40"), the initial degree of similarity is 3. In addition, the similarity between the abstract query results may be 2 because both sets of results contain ID numbers 23 and 48. Finally, both the first and second abstract queries request a linear regression analysis on weight, yielding a similarity of 1. The overall similarity may then be calculated as the sum of the similarity of the abstract queries, the results, and the analyses, resulting in an overall similarity of 6.

In another embodiment, the overall degree of similarity of two abstract queries, results, and analyses may be calculated with respect to the objects representing the average abstract query, result, and analysis in the following manner. Because the first abstract query and the second abstract query contain 3 components in common (both request "ID" and "Weight" where "Age>40"), the initial degree of similarity is 3. However, the average abstract query in the system contains a request for the "ID", so "ID" is common to most abstract queries and may be discounted, resulting in a degree of similarity of 2. The degree of similarity may be adjusted downward based on the similarity of the common query-related objects (both contain "ID" fields) to the average query-related object (which also contains an "ID" field) because, where an object is common to most of the queries in a system, the fact that two queries happen to contain that object is not a significant reason for finding that the queries are similar. In other words, any researcher viewing the results of the comparison may not find it significant that both have requested that ID results be returned, while each researcher may find it significant that both have requested the weight field where the age was greater than 40. Thus, the similarity between the abstract query results may be 2 because both sets of results contain ID numbers 23 and 48 but because the average abstract query result contains ID number 23, the adjusted similarity is 1. As for the similarity of the results analyses, both the first and second set request a linear regression analysis on weight, yielding a similarity of 1, and because there may be no typical abstract results analysis which is run in the system, the similarity of 1 remains unchanged. As above, the similarity of the abstract queries as a whole may be the sum of the similarity of the query conditions, the results, and the analyses, resulting in an overall similarity of 4.

Similarity may also be calculated in more complicated manners according to other embodiments of the invention. For instance, as described above, different comparisons being performed may be assigned different weights. This may be accomplished by assigning certain query objects, result objects, or analysis objects different weights. The weights may be assigned by information gathered from an administrator or by looking statistically at the history of the queries in a system. The weights assigned to each object may be stored in a field in a data repository abstract, in the comparison criteria 708, or in any way known to those skilled in the art. Thus, in one embodiment of the invention, each field represented in a query object may have an assigned weight. If, for instance, name fields are being compared, the comparison may be given a low weight because of the statistical insignificance of the field. If, however, heart pathway information fields are being compared, the comparison may be given a high weight because of the specificity of the request and thus the greater statistical significance of the field. According to another embodiment of the invention, different analyses may be given different weights. For instance, a standard results analysis routine represented by an analysis object may have a low weight whereas a complex statistical analysis of electrocardiogram regularity may have a high weight. On a more specific level, parameter settings within each analysis routine may be compared. Thus, in one embodiment of the invention, the setting of a parameter for an enzyme to analyze may have a high weight whereas the report title may have a low weight.

According to another embodiment of the invention, the comparison may be performed with respect to metadata associated with each user or with each abstract query. For instance, metadata may be stored for each saved query which indicates that the query is saved. If the metadata shows that both being executed queries are saved queries the queries may be found to be more similar than if they were both unsaved. Metadata may also be stored which indicates whether both queries are used often. If the metadata shows that both queries are executed frequently, the queries may be found to be more similar than if they were both used rarely. The comparison may also be performed with respect to a group within which each condition, result, or analysis falls. For instance, if a first analysis about blood type falls into the same category as a second analysis about platelet count, the analyses may be found to be similar because they are in the same group even though the actual analysis being performed with each query may be different. Such information regarding the group within which an object falls may be stored within the object or within the comparison criteria 708. According to another embodiment of the invention, the comparison may be performed with respect to when an object occurs in a workflow. For instance, if analysis routines X, Y, and Z were the 8th, 12th, and 15th steps in otherwise different 20 step workflows, each workflow may be similar to the other and thus the research being performed may be similar.

In another embodiment, the comparison may be made with respect to objects representing "event profiles" which may be used in each abstract query being compared. Event profiles are conditions about conditions with a temporal context in the database. For example, while a condition finds people that had Test x and are over 40 years old, an event profile finds people that had text x when they were over 40 years old. Event profiles are described in detail in the commonly owned, co-pending U.S. patent application Ser. No. 10/094,531, entitled "GRAPHICAL USER INTERFACE TO BUILD EVENT-BASED DYNAMIC SEARCHES OR QUERIES USING EVENT PROFILES", filed Mar. 8, 2002, which is incorporated by reference in its entirety.

The determination of whether two queries are similar may also be made in a selective manner. For instance, the determination could be made only with respect to queries exhibiting certain characteristics or with respect to certain researchers conducting certain research. The determination may be made selectively because of the overhead costs necessary to calculate the similarity between research information such as the queries, the results, and the analyses being run. For instance, if a query returns a larger number of results, the determination of whether the query is similar to any other query may not be made because of the large number of comparisons necessary to determine if all of the results are similar. Alternatively, the determination of similarity in this case may only be made with respect to the queries and the analyses, while ignoring the similarity between the results.

According to another embodiment of the invention, the similarity of the research information may be made only with respect to certain researchers. For instance, if two researchers are conducting research in completely unrelated fields, the research information for those two researchers may not be compared because no similarity may be expected between the research information of the two researchers. The determination of whether the researchers are researching in unrelated fields may be made according to the specific databases being accessed by each researcher, by an administrator who oversees all of the research being conducted in the system, or by any other method known to those skilled in the art. Similarly, if two researchers are conducting research in closely related fields, this fact may trigger the comparison to determine if the research information for the two researchers is similar.

According to another embodiment of the invention, the comparison may be made only with respect to researchers that are conducting very complicated or expensive research. Thus, if similarities are found between the complicated or expensive research and other research, the costs of the complicated or expensive research may be reduced by allowing the researchers conducting both sets of research to share resources and avoid duplicative research. An administrator or some other overseeing party may determine whether the research is complicated or expensive. The administrator may record the information relating to the type of research being performed by each researcher in a user profile which is unique to the researcher, and this profile may be accessed by the component performing the comparison of abstract queries to determine whether or not to perform the comparison.

In another embodiment of the invention, comparisons may be made with respect to a grouping assigned to each researcher. In one embodiment of the invention, researchers working on the same research project or in the same lab may be placed in a group. For purposes of performing the comparison, queries by researchers within the same group may be ignored because researchers working on the same project or in the same lab may already be sharing the same information and resources for a common project. Thus, the comparison may only be performed with respect to queries from researchers in different groups where members of each group are less likely to be aware of each other. In addition, if two groups are performing wholly unrelated research, the comparison of queries from each group may not be performed because of the unrelated nature of the research being performed by each group. According to other embodiments of the invention, each group may be further contained in one or more subgroups, and so on, such that the comparison may or may be made with respect to certain aggregations of groups and may not be made with respect to other aggregations of groups. User IDs and group IDs, as well as other methods known to those skilled in the art, may be used to determine which group a researcher is in for purposes of the comparison. The user IDs or group IDs may be recorded within each query-related object being compared according to one embodiment of the invention, but the IDs may also be stored in other ways according to other embodiments of the invention.

According to another embodiment of the invention, a running score of the similarity of queries between groups may be kept. For instance, similarity across a single query from two different groups may not be found statistically significant. If multiple queries from two groups are found to be similar, the aggregate scores of similarity may indicate that both of the groups are working on similar research and that each group should be notified about the similarity of the research being conducted.

Notifying the Users

According to one embodiment of the present invention, if a determination is made that two sets of query-related objects are similar, a notification may be displayed or delivered to the researchers or research groups. This notification may be in the form of a pop-up, an email, or extra text on a results page. The notification may also be in the form of a text message, a sound played by the computer, or any other type of notification known to those skilled in the art. A determination may also be made prior to sending the notification of whether to notify either of the researchers or whether to notify a central authority to which the researchers report. The determination of whether to notify a user or administrator may be made based upon whether the similarity between the two sets of research information is greater than a given threshold. For instance, the threshold for similarity may be set by a central authority as 3. In the example given with regards to Table IV, where the similarity may be calculated as 4, the similarity of the two sets is above the threshold of 3 and thus the notification that the two sets are similar may be displayed to the two researchers, the central authority, or both.

According to another embodiment of the invention, each party involved may set a personal threshold for similarity. For instance, the first researcher may set the personal threshold for similarity as 2, the second researcher may set the personal threshold for similarity as 5, and the central authority may set the personal threshold for similarity as 3. Thus, with a similarity of 4, both the first researcher and the central authority may be notified of the similarity while no notification may be given to the second researcher.

In another embodiment of the invention, the notification may contain varying amounts of information about the similarity of the sets of research information. For instance, the notification may only alert each party that another set of research information is similar. According to another embodiment of the invention, the notification may contain more information about the similarity of the research information, such as the reasons for the similarity and exact value calculated for the similarity.

According to another embodiment of the invention, after a determination has been made that one set of research information is similar to another set of research information, other actions may be taken or other information may be provided in addition to displaying a notification of the similarity. For instance, the notification may contain an option which allows the researchers involved to place a phone call to each other or send each other a message such as an email message, a text message, a voicemail message, or any other message known to those skilled in the art. As an alternative, the notification may merely contain contact information for the other researcher. The researchers may be provided with the option of contacting each other so the researchers may determine if they could benefit from sharing research data, sharing research equipment, or discussing research problems and ideas. Thus, allowing the researchers to contact each other may allow both researchers to benefit from each other's experience.

In yet another embodiment of the invention, the notification may be displayed to the user as a ranked list of comparison results in a user interface. FIG. 10 depicts a graphical user interface (GUI) 1000 for displaying a list of comparison results according to one embodiment of the invention. The results list may contain a column 1002 showing the result rank, a column 1004 showing the researcher being compared as well as the researcher's location, column showing the degree of similarity of the objects being compared (referred to in the figure as a "Similarity Score"), and a column 1008 showing an analysis of the comparison results. The results 1010, 1012, and 1014 may be listed in order according to their rank. For instance, the first result 1010 may have a similarity score of 7 because 3 query conditions, 2 query results, and 1 analysis routine were found to be similar between the researchers (3+2+1=6), and the similarity score may have been incremented an additional time because one of the query results found to be similar may have been new and may thus warrant extra attention from the researcher. Other, lower ranked results such as the result 1014 may be ranked lower because fewer objects were found to be similar than in the other results 1010 and 1012. In some cases, there may be no similarity in certain categories of object types. Thus, result 1014 may show that the researchers only had 2 similar query objects and no other type of object was found to be similar.

Comparison of Queries in Different Environments

Comparison of the abstract queries may be performed by different components according to different embodiments of the invention. According to one embodiment of the invention, the comparison may be performed by the query comparator 170. According to another embodiment of the invention, the comparison may be performed by the component which processes the abstract queries, such as the runtime component 150. Thus, the functionality for performing the comparison may be built into the runtime component 150 without the need for any external programs. According to yet another embodiment of the invention, the functionality for performing the comparison may be added in a separate application such as the application 140. Thus, in addition to processing incoming requests, the application 140 may also initiate and perform the abstract query comparisons. According to other embodiments of the invention, the comparison may be performed by any component or group of components working together or in any other manner known to those skilled in the art. In addition, the components may be located on a server computer such as the server 104, on a client computer such as the client computer 102, or on another computer.

The component performing the comparison may obtain information about the condition objects, result objects and analysis objects being compared in different ways according to different embodiments of the invention. According to one embodiment of the invention, the component performing the comparison may obtain the information through an auditing plug-in. The plug-in may hook into the component which processes the abstract queries and retrieve the information about the query conditions, results, and analyses as objects. The component performing the comparison may then compare the queries using the objects retrieved from the plug-in (as described above). According to other embodiments of the invention, the information used to perform the comparison may be obtained using an Application Programming Interface (API) provided by the designer of the component. The information may also be obtained by analyzing a log created by the component which processes the abstract queries. The information used for comparison of the abstract queries may also be obtained in other ways known to those skilled in the art.

Embodiments of the invention may be adapted for use with different database configurations. According to one embodiment of the invention, the abstract queries may be executed against a database operating in standalone mode. For instance, each user may directly access the computer on which the database system is operating and may directly request that abstract queries be executed. Thus, each incoming abstract query may be recorded and compared to other queries being executed on the standalone system. According to another embodiment of the invention, the abstract queries may be submitted directly by multiple users accessing the database system through terminals on a client system such as the client computer 102.

As described above, the incoming abstract queries may also be submitted indirectly using different types of requests. For instance, the user may use an HTML form downloaded from the server computer 104 to select and submit the abstract query. The form may be used to select saved queries to be executed, to manually enter an abstract query, or to select query conditions, results, and analyses using different features provided for by HTML forms. Upon submitting the HTML form, the user's browser program 122 may encode the form contents into an HTTP request and the request may then be sent by the network interface device 118 across the network 126.

Each user may also use a series of forms to compose an abstract query before the query is submitted. The series of forms used by each user may be different, yet the final abstract queries for each user may be similar to each other. For instance, one user may use a series of forms which walks the user through the selection of query conditions, result fields, and analyses to be performed whereas another user may enter an abstract query into a form manually. Despite the different methods used to format and submit the abstract queries, the final abstract queries may be found to be similar, thus meriting notification of one or more of the users.

According to other embodiments of the invention, the request may be made without HTML forms and may be encoded in formats other than the HTTP format, such as a custom request format. In addition, the request may also be submitted using an application other than the browser program 122. For instance, the requests may be submitted by a web application which may be downloaded and executed by the browser program 122. The requests may also be submitted by a standalone program other than the browser program 122, or in any other method known to those skilled in the art.

Each request being made may be submitted in different manners according to other embodiments of the invention. For instance, different forms, which may be written in different languages, may also be used to submit abstract queries to the same database system. Thus, while each user may submit requests in different languages using forms which look different, each request may be received and decoded into an abstract query by the server computer 104. A comparison of two abstract query objects may be made after the requests have been decoded into abstract queries. Despite the different forms and different languages used to compose the abstract query, the final queries submitted by each user may be similar. Comparing the abstract queries after they have been received and decoded may also allow the queries to be compared without regard to different security settings or preference settings on the user's client computer 102 which may otherwise interfere with the comparison of the abstract queries.

In another embodiment, a user may select a saved abstract query to be executed whereas another user may compose a specific abstract query manually. Thus, while the first request may be for "saved_query_1", the second query may contain a query string manually selected by a user. When compared, the objects from the saved abstract query and the objects from the manually composed abstract query may be similar, allowing each user to be notified of their similar research despite the different method of requesting the abstract queries.

Users may also customize environments by selecting different DRAs or different views of DRAs. According to one embodiment of the invention, each user may submit abstract queries which are composed, and subsequently transformed into concrete queries, using different DRAs or views. A description of the use of different DRAs and different views is included above with reference to FIGS. 5A, 5B, and 6.

As mentioned above, DRAs define the logical fields used to compose abstract queries. The logical field definitions contained in the each DRA may be used to build a concrete query based on the logical fields used in the abstract query. While different DRAs or different views of DRAs may use the same name for a logical field, the logical field may be defined differently in each DRA or view. As a result, the concrete queries created using different DRAs or views may be different. Thus, a comparison of concrete queries created using different DRA components may be difficult because each concrete query may be made in different formats (XML, SQL, etc.) or each concrete query may request information stored using different table or column names. However, because each DRA may use the same logical field names to transform abstract queries into concrete queries, comparison of query-related objects containing the logical field names used by each abstract query may still yield useful results about the similarity of the information being requested by each user, despite the wide variety of resulting concrete queries. Further, because each user may be using a different DRA, the similarity of each user's request may also be determined by comparing objects containing information about each user's DRA. If the DRAs are the same or similar, the query-related objects may be found to be more similar. If the DRAs are different, the query-related objects may be found to be less similar. In this regard, it is contemplated that fields of one DRA may be mapped to appropriate fields of one or more other DRAs. For example, Field_1 of DRA1 can be mapped to Field_2 of DRA2. This kind of mapping may be appropriate, for example, to relate common fields and facilitate identification of similar query objects. The mapped fields may or may not be identical fields. As an example, Field_1 of DRA1 may be named "Gender" while Field_2 of DRA2 may be named "Sex". Although the field names are different, the data to which the respective fields relate is the same, i.e., gender. Note that the columns and tables to which the respective fields are mapped (in the logical field specifications) need not be the same. For example, Field_1 of DRA1 may be mapped to Column 2 of Table 1 in Database 1 and Field_2 of DRA2 may be mapped to Column 9 of Table 3 (in Database 2).

While the foregoing is directed to embodiments of the present invention, other and further embodiments of the invention may be devised without departing from the basic scope thereof, and the scope thereof is determined by the claims that follow.

What is claimed is:

1. A computer-implemented method for comparing query-related objects, comprising:
   receiving a first plurality of query-related objects for a first user;
   receiving a second plurality of query-related objects for a second user, wherein both the first and second plurality of query-related objects include objects of different object types;
   determining a degree of similarity between the first and second plurality of query-related objects of the same object type, comprising:
   determining a plurality of query-related objects based on their frequency of use in composing queries; and
   calculating the degree of similarity based on comparing the first plurality of query-related objects of each object type with the second plurality of query-related objects of the same object type, wherein the degree of similarity is reduced upon determining that the first plurality of query-related objects and the second plurality of query-related objects contain at least one query-related object that is similar to one of the determined plurality of query-related objects;
   and
   upon determining that the degree of similarity exceeds a predefined threshold for similarity, issuing a notification of the degree of similarity to the first user, wherein the notification identifies the second user using contact information associated with the second plurality of query-related objects.

2. The method of claim 1, wherein the first and second plurality of query-related objects include abstract queries resolved against a logical model abstractly describing physical data, wherein the logical model comprises a plurality of logical fields defined by a logical field name and an access method, wherein the access method specifies a technique for returning a value for the respective logical field and wherein the access method is selected from two or more different types of access methods.

3. The method of claim 1, further comprising:
   determining a value for a typical degree of similarity of a plurality of query-related objects; and
   calculating the predefined threshold for similarity, based on the determined value for the typical degree of similarity.

4. The method of claim 1, wherein each received query-related object is one of a query object, a result object, and an analysis object.

5. The method of claim 1, further comprising: assigning a weight to each received query-related object; and using the weight assigned to each received query-related object to adjust the degree of similarity between the first and second plurality of query-related objects.

6. The method of claim 1, wherein comparing the first plurality of query-related objects with the second plurality of query-related objects to determine the degree of similarity comprises:
   comparing a component of each of the query-related objects in the first plurality of query-related objects with a component of each of the query-related objects in the second plurality of query-related objects to determine a degree of similarity of the components; and
   using the degree of similarity of the components to determine the degree of similarity of the first and second plurality of query-related objects.

7. The method of claim 1, wherein the notification contains information that allows at least one of the first user and the second user to communicate with the other user.

8. The method of claim 7, wherein at least one of the first user and the second user communicates with the other user by placing a phone call or sending an email message, a text message, or a voicemail message.

9. A computer-implemented method for comparing query-related objects, comprising:
   receiving a first plurality of query-related objects for a first user;
   receiving a second plurality of query-related objects for a second user, wherein both the first and second plurality of query-related objects include objects of different object types;
   retrieving contact information associated with the second plurality of query-related objects, wherein the contact information pertains to the second user;

determining a degree of similarity between the first and second plurality of query-related objects of the same object type, comprising:

assigning a weight to each received query-related object;

determining a plurality of query-related objects based on their frequency of use in composing queries; and calculating the degree of similarity based on comparing the first plurality of query-related objects of each object type with the second plurality of query-related objects of the same object type, wherein the degree of similarity is reduced upon determining that the first plurality of query-related objects and the second plurality of query-related objects contain at least one query-related object that is similar to one of the determined plurality of query-related objects;

and upon determining that the adjusted degree of similarity exceeds a predefined threshold for similarity, issuing a notification of the degree of similarity to the first user, wherein the notification contains at least a portion of the retrieved contact information for the second user and that allows the first user to communicate with the second user.

10. The method of claim 9, wherein the information allows at least one of the first user and the second user to communicate with the other user by placing a phone call or sending an email message, a text message, or a voicemail message.

11. A computer-implemented method for comparing query-related objects, comprising:

receiving a first plurality of query-related objects for a first user;

receiving a second plurality of query-related objects for a second user, wherein both the first and second plurality of query-related objects include objects of different object types;

retrieving contact information associated with the second plurality of query-related objects, wherein the contact information pertains to the second user;

comparing the first plurality of query-related objects of each type with the second plurality of query-related objects of the same object type to determine a degree of similarity between the first and second plurality of query-related objects of the same object type; wherein comparing comprises:

comparing a component of each of the query-related objects in the first plurality of query-related objects with a component of each of the query-related objects in the second plurality of query-related objects to determine a degree of similarity of the components;

determining a plurality of query-related objects based on their frequency of use in composing queries; and using the degree of similarity of the components to determine the degree of similarity of the first and second plurality of query-related objects, wherein the degree of similarity is reduced upon determining that the first plurality of query-related objects and the second plurality of query-related objects contain at least one query-related object that is similar to one of the determined plurality of query-related objects; and upon determining that the degree of similarity exceeds a predefined threshold for similarity, issuing a notification of the degree of similarity to the first user, wherein the notification contains at least a portion of the retrieved contact information for the second user and that allows the first user to communicate with the second user.

12. The method of claim 11, wherein the information allows at least one of the first user and the second user to communicate with the other user by placing a phone call or sending an email message, a text message, or a voicemail message.

* * * * *